March 28, 1933.  F. C. PALENSKE  1,903,225
RUBBER WEATHER STRIP
Filed Aug. 11, 1931

Inventor
Frederick C. Palenske
By Arthur F. Durand
Atty.

Patented Mar. 28, 1933

1,903,225

UNITED STATES PATENT OFFICE

FREDERICK C. PALENSKE, OF ST. JOSEPH, MICHIGAN, ASSIGNOR TO INDUSTRIAL RUBBER GOODS COMPANY, OF ST. JOSEPH, MICHIGAN, A CORPORATION OF MICHIGAN

RUBBER WEATHER-STRIP

Application filed August 11, 1931. Serial No. 556,345.

This invention relates to rubber weather strips for engaging the edges of movable glass windows, such as those on automobiles, or for similar purposes.

Generally stated, the object of the invention is to provide a novel and improved construction or formation of rubber stripping of this kind, whereby the strip has side portions that tightly engage the inner and outer surfaces of the glass or other movable member, with an air space at each side back of the means for engaging the inner and outer surfaces of the glass or other member, thereby to provide a substantial wind and water-tight joint when the window is closed.

It is also an object to provide certain details and features of construction tending to improve the general efficiency and the desirability of a rubber stripping of this particular character.

To these and other useful ends, the invention consists in matters hereinafter set forth and claimed and shown in the accompanying drawing, in which—

Figure 1:
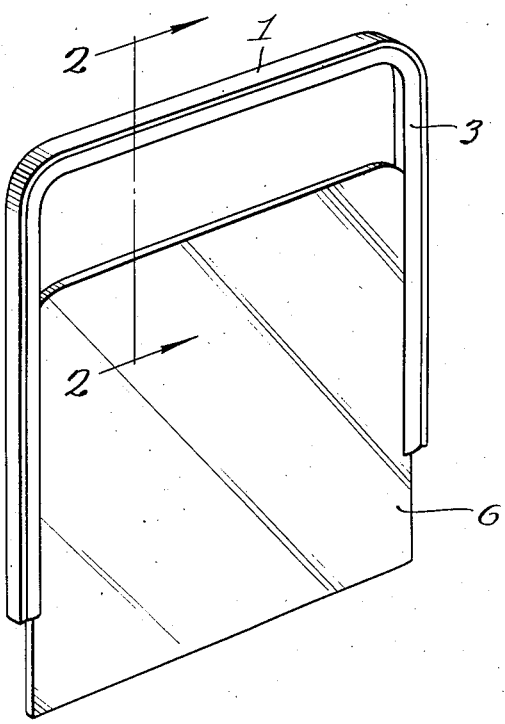
Fig. 1 is a perspective of a length of rubber stripping embodying the principles of the invention, showing the glass window partially open.
Figure 2:
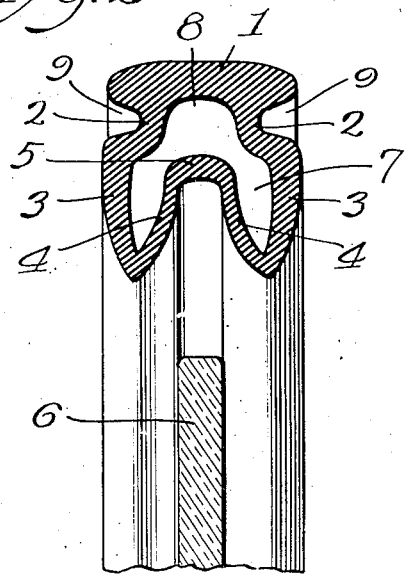
Fig. 2 is an enlarged section on line 2—2 in Fig. 1.

As thus illustrated, the rubber stripping shown comprises in the normal or molded condition thereof, when in its undistorted condition, a base portion 1, which is attached in any suitable or desired manner to the window frame, or to the structure of the body of the motor vehicle, or other structure, the invention not being limited to automobile windows, although particularly adapted for that purpose.

The base portion 1 is integral with neck portions 2 at each side thereof, and these neck portions are integral with the outer side portions 3, and the latter are integral with the inner side portions 4, the latter being integrally connected together by an inside or interiorly arranged base portion 5, as shown. In this way an outwardly flaring channel is formed between normally hollow side walls.

Figure 3:
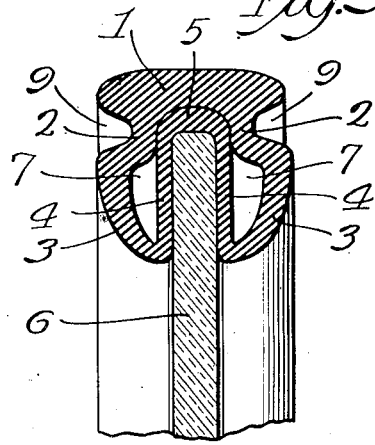
Fig. 3 is a similar section, showing the glass window in closed position.

With this construction, when the glass window 6 is in closed position, the portions 4 and 5 tightly hug the edge portion or marginal portion of the glass, as shown in Fig. 3 of the drawing, thereby forming a wind and water-tight joint. It will also be seen that the air spaces 7 are formed at each side of the glass window, back of the portions 4, and the compressed air in these spaces tends to hold the rubber portions 4 in tight engagement with the inner and outer surfaces of the glass window. The construction tends to cushion the closing movement of the window and, in addition, the cushioning action and the tight joint formed serve to prevent the window from rattling.

It will also be seen that the base portion 1 is formed interiorly with a channel 8, into which the portion 5 is forced by the closing of the window or other member. Again, the external formation of the strip provides the two side channels or grooves 9, which facilitate attachment of the strip in position.

Rubber stripping of the kind shown and described is easily and conveniently formed, whereby the manufacture of the stripping is comparatively inexpensive, the rubber being moulded into the desired shape by any suitable known or approved method, and by expedients well known to manufacturers of rubber articles of this kind.

It will be seen that the interior air space of the hollow weather strip, by means of the specific formation shown and described, when viewed in cross section, is normally sealed at all points in the length thereof, even though the ends of the space might be open.

What I claim as my invention is:

1. A hollow rubber weather strip for the edge of a glass window or other movable member, having its longitudinal interior air space normally closed at all points in the length thereof, comprising, in the normal condition or shape thereof, when viewed in cross-section, an integral base portion for attaching the strip in stationary position to a suitable support, outer side walls integrally connected with said base, free to bend toward and away from each other, and inner side walls normally spaced from and integral with the outer edges of said outer side walls, forming an outwardly flaring channel between them, said inner side walls being normally spaced a distance from said base, and adapted to engage the inner and outer surfaces of the window or other member, thereby in effect forming flexible hollow side portions with their interiors normally intercommunicating and with a channel between them to receive the edge portion of said member, each double wall side portion thus provided remaining hollow with an air space therein while said member is between them, as well as when said member is withdrawn, but with the interior of one side portion cut off from communication with the interior of the other side portion when said member is between them.

2. A structure as specified in claim 1, said inner side walls being integrally connected at their inner edges, adjacent said base, but normally out of engagement with said base, thereby forming an interiorly arranged base portion which is forced against the first-mentioned base portion by the closing of the window or other member.

3. A structure as specified in claim 1, said outer side walls being connected by neck portions with said base portions, forming side grooves between the base portions and the outer side portions to facilitate attachment of the strip in position.

4. Rubber stripping adapted to form a tight joint between relatively movable members, comprising in cross-section, in the normal condition or shape thereof, a base portion for attachment to one member, and a hollow portion extending from the base portion and formed with a channel to receive the other member, providing hollow sides for the channel, which hollow sides are free to bend toward and away from each other, forming an outwardly flaring channel between them, being adapted to yield and engage the opposite sides of said other member, but with air space in each hollow side while said other member is between them, as well as when said member is withdrawn.

5. A structure as specified in claim 4, said channel having a movable base portion normally out of engagement with said first-mentioned base, adapted to be pushed against the latter by the entrance of said other member into said channel.

6. A structure as specified in claim 4, said channel having a movable base portion normally out of engagement with said first-mentioned base, adapted to be pushed against the latter by the entrance of said other member into said channel, said first mentioned base portion having a longitudinal groove to receive said movable base portion.

7. A structure as specified in claim 4, said hollow sides being adapted to yield and conform flatwise upon the opposite flat surfaces of said other member, when the bottom of said channel is pushed against said base.

Specification signed this 3rd day of August, 1931.

FREDERICK C. PALENSKE.